Patented July 2, 1940

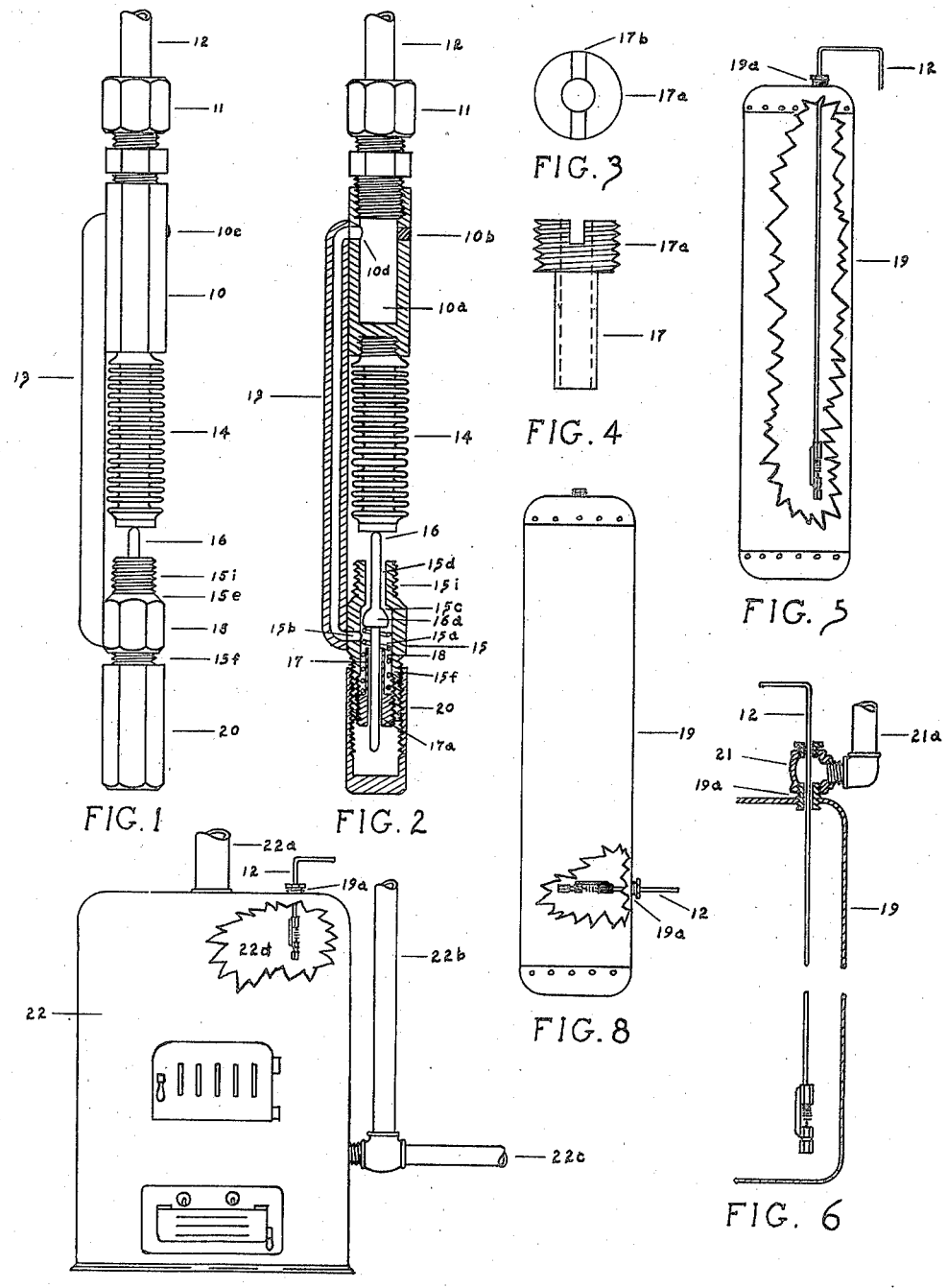

2,206,601

UNITED STATES PATENT OFFICE 2,206,601

RELIEF VALVE FOR HOT WATER TANKS AND HEATING SYSTEMS

Edward F. Donnelly, Malden, and Thomas J. McCarthy, Peabody, Mass.

Application February 24, 1939, Serial No. 258,270

2 Claims. (Cl. 137—53)

This invention relates to improvements in relief valves for hot water tanks and supply systems.

Hot water storage and supply tanks are often injured by extra strains and sometimes destroyed by explosions because of excessive water temperature or water pressure. The injurious results and the danger involved are too well known to need further discussion herein. Unless the tanks or systems are provided with efficient means of relief from high temperature and pressure changes, the possibility of such results as have been mentioned is always present.

An object of our invention is to provide means whereby water is released from the tank or system through a valve positioned within the tank upon rise of water temperature or water pressure above a safe limit.

Another object is to provide means for permitting the water in the tank to become more efficiently heated throughout before the safe limit of heating is reached. In this respect, we desire to call attention to the fact that other valves used for the purpose are so positioned on the tanks that they do not permit proper heating of all of the tank water because the excessive heat at the positions of the valves causes them to open before this desirable action is gained, thus causing delay, loss of water and increasing the cost of heating the water.

Other advantages will be obvious to those skilled in the art and to users of the invention.

In the drawing that accompanies this application for a patent as a part thereof, Figure 1 shows our complete unit ready for installation; Figure 2 is a similar view, partly in section; Figures 3 and 4 are details showing adjustment guide; Figure 5 shows the unit applied through the top of a vertical tank; Figure 6 illustrates its application to old installations; Figure 7 shows it installed in a hot water heater of a heating system; and in Figure 8 it is set in through the side of a vertical tank.

Referring to the drawing, 10 is a relief casing having a relief chamber 10a therein, the chamber being closed at one end and at its open end having threads which engage a nipple 11 to which a relief tube 12 is attached. In the side wall of the casing is a port 10b in which is a fusible plug 10c. Also in the side wall of the casing is a port 10d to which a tube 13 is attached. Attached to the relief casing at its closed end is a thermostatic bellows 14, preferably by threaded engagement so that the bellows may be removed if desired. A valve casing 15 with a valve chamber 15a has a port 15b in its side wall and is attached to tube 13 so that there is a continuous passageway for water between the valve chamber and relief chamber. An end wall of the valve chamber comprises a valve seat 15c and a valve port 15d extends therefrom towards the free end of the bellows. The valve casing has externally threaded extensions 15e and 15f at the ends. A valve plunger 16 in the valve chamber carries a valve 16a which engages the valve seat. The plunger extends through the valve port to the end of the bellows and also extends beyond the other end of the casing. The extension 15f is threaded internally to engage an enlarged threaded head 17a of a hollow guide 17 in which the valve plunger is movably mounted. Positioned so as to surround the valve plunger and guide and butting against valve 16a and guide head 17a is a spring 18. The guide is shorter than the distance between the guide head and valve in order to allow movement of the guide to adjust the tension of the spring. A screw cut 17b in the outer end of the guide head permits adjustment of the spring by turning the guide to create greater or less tension of the spring as may be required for adjustment of the valve to predetermined pressure demands as will be pointed out hereinafter. A cap 20 engages the exterior threads on extension 15f to prevent water from entering the valve chamber. The relief tube 12 passes through a suitable detachable spud connection 19a in the tank 19. The external threads 15i on extension 15e of the valve casing are for the purpose of attaching the valve casing to water pressure testing apparatus.

The valve plunger and valve are made of a single piece of non-ferrous metal and there is substantially no expansion or contraction of the metal due to changes of temperature. Also, in the construction of the unit there are no washers or gaskets. It is well known in the art that expansion and contraction of such parts often offset the predetermined adjustment of the thermostatic element and tension and are detrimental to the efficiency of the unit. In our construction no such conditions exist and the valve action is at all times positive at the predetermined pressure and temperature adjustments.

In vertical tanks the unit is preferably positioned a little below the middle horizontal line of the tank and in horizontal tanks close to or resting on the bottom side of the tank. The device may be positioned otherwise, however, as through an end or side of either a vertical or horizontal tank. Also the valve may be positioned elsewhere in the tank than in our preferred position by using a longer or shorter relief tube. For example, by using a shorter tube than shown in Figure 5 the valve may be positioned close to the top of the tank and with a longer tube it may be positioned at the bottom, all of which positioning comes within the scope of our invention.

In Figure 6 we have shown how our invention is positioned in old installations. We provide a T-fitting 21 having a port to which the hot water distributing pipe 21ª is connected. The relief tube 12 passes through a port in the T-fitting and is held in position by the spud 19ª. The diameter of the outlet from the tank is greater than the diameter of the relief tube so that when hot water is drawn it passes freely from the tank.

In Figure 7 we have shown how the relief valve is installed in a hot water heater for adjustment of temperature. 22 is a heater, 22ª the hot water feed pipe, 22ᵇ the return pipe, 22ᶜ the cold water intake and 22ᵈ the water dome. Such installation and its operation will be understood without further description.

The device is installed by removing the connection 19ª from the tank, passing the relief tube through it and securing the tube in the connection so as to allow proper positioning of the relief valve in the tank, then passing the relief valve through the connection port of the tank and positioning and tightening the connection 19ª.

Normally, the valve is closed and held in position by the spring. The end of the valve plunger is preferably in contact with the end of the bellows and there is no movement of water in the valve chamber, tube 13 and relief chamber. Rise of temperature above a predetermined degree to which the device has been adjusted causes extension of the bellows to exert pressure on the valve plunger and overcome the resistance of the spring, thus causing the valve to open and allow water to flow from the tank through the valve port, valve chamber, tube 13 and relief chamber to and through relief tube 12 to a drain pipe, sink or other receptacle.

Water pressure above the predetermined resistance pressure to which the spring has been adjusted forces the valve to open by direct pressure of the water on the valve through the valve port and allow water to flow through the valve chamber, tube 13, relief chamber and relief tube to drainage.

Upon reduction of temperature below the predetermined safe limit the bellows contracts, releasing pressure on the spring which then closes the valve. Upon reduction of water pressure below the predetermined resistance pressure of the spring, the same result follows.

As is known to those skilled in the art, relief valves must be set to operate at various pressures depending upon the pounds tests applied to the tanks. For example, a 200 pounds test tank requires a valve set to open at 85 pounds pressure; a 250 pound tank, at 106 pounds; a 300 pound tank, at 127.5 pounds; and for 350 pounds or more, at 147.5 pounds. Our valve is adjustable for any of such pressures by changing the tension of the spring until the proper spring tension is applied to the valve.

As already stated, the valve operates to open upon rise of temperature above a predetermined safe limit. This is made possible by charging the bellows with a proper amount of expansible fluid to open the valve at such predetermined degree of temperature.

If for any reason the relief valve fails to operate upon rise of temperature, the fusible plug 10ᶜ is melted and water flows through the relief tube, as required by safety regulations.

It will be seen from the foregoing description that our invention is simple in construction, economical to make and easily installed. In addition we desire to point out a distinct advantage over other constructions and installations. As has been stated, other safety valves are placed in the pipe line outside of the tank. The known result of such positioning of the valves is that the hottest water passes directly from the tank into the relief valve while the water is being heated. As it is the practice to pass the hot water from the heater into the tank at or near the top, this water becomes highly heated before the rest of the tank water has become heated to the desired temperature for use. Under such conditions the thermostatic element of the relief valve causes the valve to operate frequently to run off the hottest water and when this occurs cold water enters the tank and cools the water, thus preventing proper heating of the water throughout the tank. On the other hand, our preferred positioning of the valve permits complete heating of the tank water to a proper temperature without danger of the tank being injured, because, as it is positioned well down in the tank, the whole body of water becomes thoroughly heated to a safe degree of temperature before the water surrounding the unit becomes heated to the predetermined safe valve opening expansion of the bellows.

We have described our preferred construction but do not wish to be limited to the details thereof as modifications and alterations can be made that come within the scope of our claims. What we claim is:

1. In a device of the class described adapted to be positioned in a hot water container, a relief chamber in a relief casing, a relief tube attached to the casing for providing communication between the relief chamber and drainage outside of the tank, a thermostatic bellows attached to the casing, a valve casing, a valve chamber in the casing, ports in the relief and valve casings, a connected tube attached to the casings and communicating with the chambers therein through said ports in the casings, a valve seat in the valve casing, a valve port in the seat, a valve plunger passing through the valve chamber and port, a valve on the plunger adapted to make contact with the valve seat and normally seated thereon, an adjustable guide with an enlarged head movably mounted in the valve casing, extending into the valve chamber and about the valve plunger, a spring mounted on the valve plunger and guide and positioned between the valve and guide head, the bellows being adapted to extend at a predetermined degree of heat and exert pressure on the valve plunger to open the valve and the valve being adapted to open upon rise of water pressure in the tank above a safe limit, to permit water to flow through the valve port, valve chamber, the tube connection, relief chamber and relief tube to drainage, as described.

2. In a device of the class described adapted to be positioned in a hot water container, a relief chamber in a relief casing, a relief tube attached to the casing for providing communication between the relief chamber and drainage outside of the tank, a thermostatic bellows attached to the casing, a valve casing, a valve chamber in the casing, ports in the relief and valve casings, a connecting tube attached to the casings and communicating with the chambers therein through said ports in the casings, a valve seat in the valve casing, a valve port in the seat, a valve plunger passing through the valve chamber and port, a valve on the plunger adapted to make contact with the valve seat and normally seated thereon, an adjustable guide with an enlarged head movably mounted in the valve casing, extending into the valve chamber and guiding the valve plunger, a spring mounted about the valve plunger and guide and positioned between the valve and guide head, the bellows being adapted to extend at a predetermined degree of heat and exert pressure on the valve plunger to open the valve and the valve being adapted to open upon rise of water pressure in the tank above a safe limit, to permit water to flow through the valve port, valve chamber, the tube connection, relief chamber and relief tube to drainage, the bellows being adapted to contract and release pressure on the valve upon diminution of heat from said predetermined degree, the spring being adapted to exert pressure upon the valve to close the valve port upon contraction of the bellows and also upon lowering of the water pressure.

EDWARD F. DONNELLY.
THOMAS J. McCARTHY.